United States Patent
McSwiggan

(10) Patent No.: US 11,501,229 B2
(45) Date of Patent: *Nov. 15, 2022

(54) SYSTEM AND METHOD FOR QUEUE LOOK AHEAD TO OPTIMIZE WORK ASSIGNMENT TO AVAILABLE AGENTS

(71) Applicant: Verint Americas Inc., Alpharetta, GA (US)

(72) Inventor: Stephen McSwiggan, Scotland (GB)

(73) Assignee: Verint Americas Inc., Alpharetta, GA (US)

( * ) Notice: Subject to any disclaimer, the term of this patent is extended or adjusted under 35 U.S.C. 154(b) by 231 days.

This patent is subject to a terminal disclaimer.

(21) Appl. No.: 16/443,211

(22) Filed: Jun. 17, 2019

(65) Prior Publication Data

US 2020/0394585 A1    Dec. 17, 2020

(51) Int. Cl.
*G06Q 10/06* (2012.01)
*G06Q 30/00* (2012.01)

(52) U.S. Cl.
CPC ... *G06Q 10/06316* (2013.01); *G06Q 10/0633* (2013.01); *G06Q 10/063114* (2013.01); *G06Q 30/016* (2013.01)

(58) Field of Classification Search
CPC ..... G06Q 10/06316; G06Q 10/063114; G06Q 10/0633; G06Q 30/016
USPC ........................................................ 705/7.15
See application file for complete search history.

(56) References Cited

U.S. PATENT DOCUMENTS

| | | | |
|---|---|---|---|
| 10,062,042 B1* | 8/2018 | Kelly | G06Q 10/063112 |
| 2002/0159475 A1* | 10/2002 | Hung | H04M 3/5191 |
| | | | 370/465 |
| 2005/0165881 A1* | 7/2005 | Brooks | G06F 9/5027 |
| | | | 709/200 |
| 2006/0229896 A1* | 10/2006 | Rosen | G06Q 10/1053 |
| | | | 705/321 |
| 2010/0165977 A1* | 7/2010 | McCord | H04M 3/5238 |
| | | | 370/352 |

(Continued)

FOREIGN PATENT DOCUMENTS

WO    2002103464    12/2002

OTHER PUBLICATIONS

A multi-agent learning approach to online distributed resource allocation; Zhang et al.; 2009 (Year: 2009).*

(Continued)

*Primary Examiner* — Timothy Padot
*Assistant Examiner* — Francis Z. Santiago Merced
(74) *Attorney, Agent, or Firm* — Christopher M. Scherer; DeWitt LLP

(57) ABSTRACT

In the present disclosure, analytics are applied to work items while the work items are waiting in a work queue in order to optimize the routing and allocation of work items to agents in the most efficient manner possible, while optimizing agents being assigned to work items they are most qualified to handle. By performing a look ahead at more than the initial work item, the system assesses the agent skills required by imminent work items in the work queue. This is then compared to a skillset of each available and/or soon to be available agent in order to achieve the optimal allocation of the work items to maximize the work item being assigned the best qualified agent. The work items are then routed to the agents accordingly.

21 Claims, 4 Drawing Sheets

(56) References Cited

U.S. PATENT DOCUMENTS

2013/0061232 A1* 3/2013 Bernbo ................ G06F 3/0607
718/103
2014/0355749 A1* 12/2014 Conway .............. H04M 3/5238
379/265.1
2015/0106145 A1* 4/2015 Hamilton ....... G06Q 10/063114
705/7.15

OTHER PUBLICATIONS

International Search Report and Written Opinion for PCT/US2020/037907 dated Sep. 4, 2020.

* cited by examiner

SYSTEM AND METHOD FOR QUEUE LOOK AHEAD TO OPTIMIZE WORK ASSIGNMENT TO AVAILABLE AGENTS

FIELD

The present disclosure is directed to a method for computer analysis.

Specifically, the present disclosure is a system and method of optimizing work allocation assignment to the most qualified agent.

BACKGROUND

In a modern high-volume customer engagement center(s) (CEC) work allocation is typically subject to routing and queueing rules. This allocation method can often lead to a mix of different work being routed to one department, and queued in that department on a simplistic chronological manner based on arrival time and any relevant service level agreements (SLAs).

This simplistic method of work allocation within a department can lead to inefficiencies because a next available agent method of work allocation blindly allocates the next available agent. Oftentimes, the next available agent may not have an appropriate skillset to handle the next work item appropriately. In other instances, the next available agent may be overqualified to handle the work item assigned whereas the agent after that may then not be assigned a work item because they are underqualified for the remaining work items. The aforementioned inefficiencies typically result in the agent taking a larger amount of time to complete the work item, the work item requiring reallocation to another agent with the appropriate skillset, or a qualified agent being unavailable for an advanced work item because they have been assigned a work item requiring lesser skills.

Modern electronic scheduling programs are unable to provide such capabilities. As a result, customers may face inefficient handling of their communications, excessive wait times to speak with a customer service representative (CSR), and excessive transfers of their calls, leading to increased customer dissatisfaction, and CSRs will be handling calls not suited for their skill set, thus wasting an organization's money. Further, some work items may be assigned to agents lacking the skills to handle the work item, while others remain unassigned because the agents that are qualified to handle a complex work item get assigned to a work item they are overqualified to handle.

There is an unmet need in the art for a system and method capable of looking ahead into the work queue in order to optimize assignment of work items to agents such that agents are matched to the work item they are most qualified to handle.

SUMMARY

In the present disclosure, analytics are applied to work items while the work items are waiting in a work queue in order to optimize the routing and allocation of work items to agents in the most efficient manner possible, while optimizing agents being assigned to work items they are most qualified to handle. By performing a look ahead at more than the initial work item, the system assesses the agent skills required by imminent work items in the work queue. This is then compared to a skillset of each available and/or soon to be available agent in order to achieve the optimal allocation of the work items. The work items are then routed to the agents accordingly.

Accordingly, the present application overcomes the historical problems with other scheduling technology by optimizing the assignment of agents to work items they are most qualified to handle and thereby minimizing the routing of work items to agents not qualified to handle those work items, while at the same time minimizing tying up specialty agents with work items they are overqualified to handle.

An exemplary embodiment of the present application is a system and method for work allocation optimization. A work allocation engine (WAE) receives a work queue, which includes a set of work items, from the customer engagement center (CEC). The WAE also receives an agent list, which includes at least one agent, from the CEC. The WAE performs a work queue analysis of the work queue using a WAE software module on the WAE and generates an imminent work item list based on the work queue analysis. The WAE also performs an agent analysis of the work queue using the WAE software module on the WAE and generates an available agent list based on the agent analysis. The WAE passes the imminent work item list and the available agent list to a smart work allocator (SWA) and performs an optimization analysis of the first imminent work item based on the available agent list using a SWA software module on the SWA. The SWA determines a best match agent for the first imminent work item based on the optimization analysis of the first imminent work item. The SWA performs an optimization analysis of the best match agent based on the remaining imminent work items using a SWA software module on the SWA and determines a best match work item for the best match agent based on the optimization analysis of the best match agent. The SWA compares the first imminent work item and the best match work item to the best match agent and assigns one of the first imminent work item or the best match work item to the best match agent based on the comparison. The SWA updates the imminent work item list by removing the assigned work item and the available agent list by removing the best match agent.

Another exemplary embodiment of the present application is a system for work allocation optimization. The system includes a processor and a non-transitory computer readable medium programmed with computer readable code that upon execution by the processor causes the processor to execute the above-mentioned method for optimized work allocation.

Another exemplary embodiment of the present application is a non-transitory computer-readable medium programmed with computer-readable code that upon execution by a processor causes the processor to execute the above-mentioned method for work allocation optimization.

The objects and advantages will appear more fully from the following detailed description made in conjunction with the accompanying drawings.

BRIEF DESCRIPTION OF THE DRAWING(S)

DETAILED DESCRIPTION OF THE DRAWING(S)

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Figure 1:
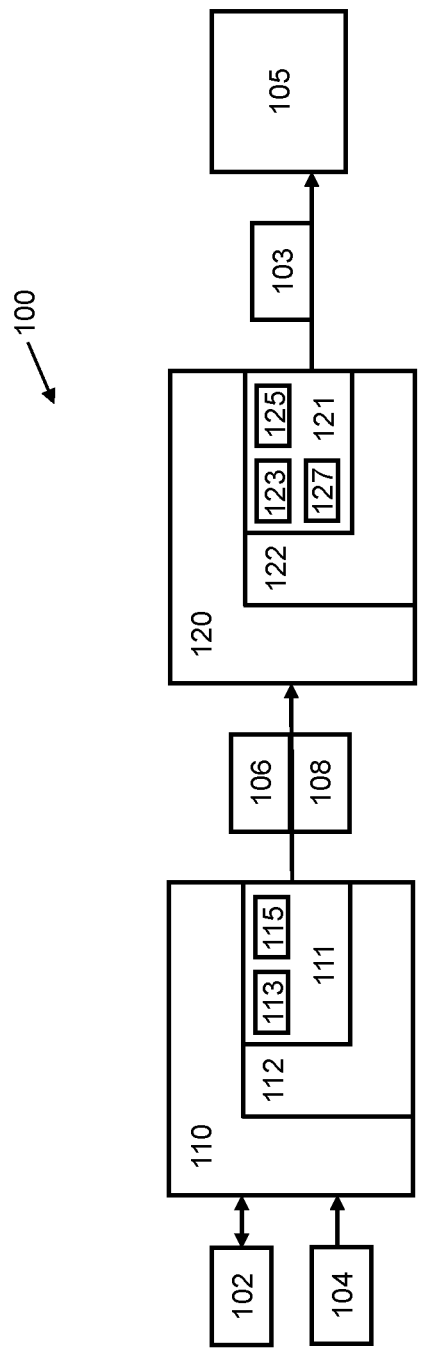
FIG. 1 depicts a block diagram of an exemplary embodiment of a CEC system for work allocation optimization.
Figure 2:
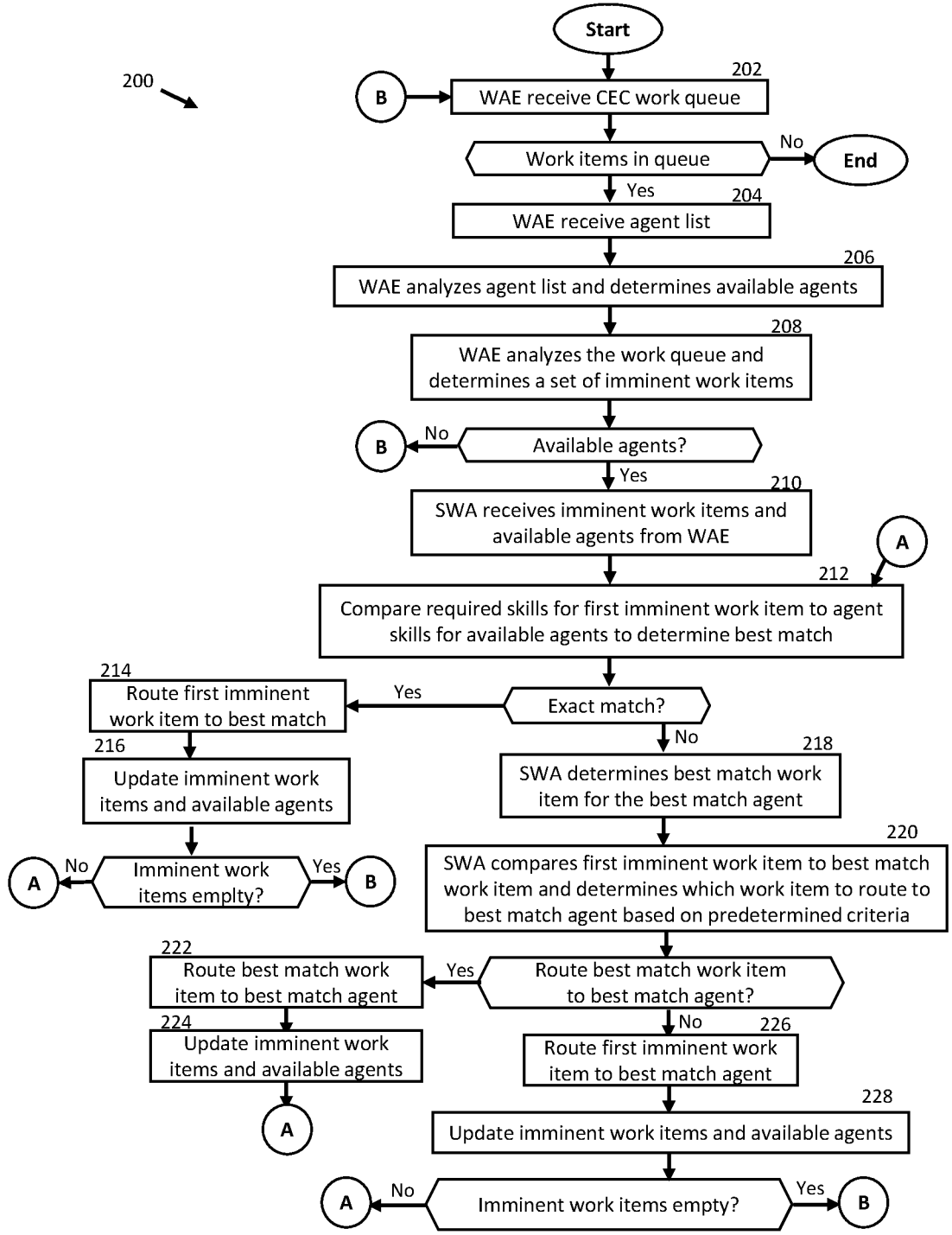
FIG. 2 depicts a flowchart of an exemplary embodiment of a method for work allocation optimization.

Referring to FIGS. 1 and 2, CEC system 100 allows CSRs to engage with customers by ensuring agents 105 are allocated to work items 103 they are most qualified to handle while minimizing assigning agents 105 to work items 103 they are overqualified to handle. A number of benefits are realized by implementing such a system 100 and method 200. First, the general efficiency of the CEC 100 is improved as routing work items 103 that have specific skill requirements from an imminent work queue 106 to properly qualified available agents 108 having optimized skillsets reduces the instances of rerouting, reduces the work time for any particular work item 103, results generally in more efficient execution of the imminent work queue 106, and minimizes the number of available agents 108 who are not assigned work items 103. Second, by ensuring that available agents 108 with specialist skills are not prematurely matched with a work item 103 when another available agent 108 may be more appropriate for the work item 103 and it can be determined that the available agent 108 with specialized skills may be required for another work item 103 that is imminent but not immediate in the imminent work queue 106, the throughput of the CEC 100 can be maximized. In other words, specialist work items 103 will not be delayed because specialist available agents 108 have been utilized to complete standard work items 103 (i.e. work items 103 with common skill requirements), while at the same time available agents 108 with common skills will not be left waiting for work because their skill sets are not sufficient for the remaining work items in the imminent work queue 106.

By optimizing the decision to allocate work items 103 in the imminent work queue 106 to the most qualified available agent 105, the CEC system 100 and method 200 avoids starving available specialized agents 105 of work items 103 by blindly holding them in reserve in anticipation of specialist work items 103 which may not even have entered the imminent work queue 106. Further, by optimizing the decision to allocate work items 103 in the imminent work queue 106 to the most qualified available agent 105, the CEC system 100 and method 200 avoids starving available common agents 105 of work items 103 by blindly assigning work items to specialized agents to the first work items 103 in the imminent work queue 106 when the remainder of the work items 103 in the imminent work queue 106 may not be suitable for the available common agents 105.

FIG. 1 depicts an exemplary embodiment of CEC system 100 for work allocation optimization.

CEC system 100 includes a work acquisition engine (WAE) unit 110 having a WAE software module 111 and an optional WAS storage 112. WAE unit 110 may be a processor or a combination of a processing system and a storage system. WAE unit 110 receives the work queue 102 and list of agents 104 from the CEC system.

The work queue 102 contains a set of work items with associated required skills 103. Work items 103 are any task that needs to be routed to an agent in the CEC system for processing. For example, work items 103 may be a direct communication from a customer such as an email, text chat, phone call, letter, etc. Work items 103 may also be case work items such as a request for a skilled individual to perform a specific task as part of a multi-step case type. Work items 103 may be received from outside the CEC through any form that the CEC has available to receive incoming communications and requests, including audio communication such as a telephone call, a voice message, a video chat, or any other type of audio communication, written communication such as an email, an online posting, a direct message from a customer, or any other written communication. Work items 103 may also originate from inside the CEC. For instance, a manager may input a case work item into the CEC for processing or the CEC system may automatically generate work items based on certain conditions in the system being met. For example, in a CEC system where transactions occur, if a transaction occurs that is over a specified value, the system may automatically refer the transaction to the underwriting department or the fraud department and would autonomously generate a work item for the transaction. Each work item 103 has a set of required skills associated with the work item 103. The required skills correlate to skills associated with an agent's abilities. For example, work item i may require a Spanish-speaking agent, whereas work item i+1 may require an English-speaking agent with skills in returns. The required skills associated with a work item 103 may be an unordered listing of the necessary skills. In other embodiments, the required skills associate with the work item 103 may be an ordered list with the most essential/important skill listed first and the least essential/important skill listed last. In other embodiments, the required skills associated with the work item 103 may be labeled as mandatory or optional. In other embodiments, the required skills may be grouped by level of importance such as primary skills, secondary skills, tertiary skills, etc. It should be understood that the number of work items 103 in the work queue 102 may continually change and the system will dynamically adjust to include all waiting work items in the work queue 102 when received by the WAE 110.

The list of agents 104 contains the customer service representatives (CSR) for the CEC system. In some embodiments, the list of agents 104 may be a list of all agents for the CEC system. In other embodiments, the list of agents 104 may be the CSRs scheduled to work the current work shift. In yet other embodiments, the list of agents 104 may be dynamically generated based on the CSRs who have signed into the CEC system. The agents 105 contained on the list of agents 104 may be at various stages of preforming work and may or may not be available to be assigned work. Each agent 105 in the list of agents 104 has a set of agent abilities associated with the agent. Every agent 105 will have at least one ability. The agent abilities are the types of skills in which the agent is qualified. For example, agent A may speak English and Spanish and may also be skilled in returns; whereas agent B may speak English and Spanish and be skilled in new accounts. As indicated above, the agent abilities will correlate to the required skills for work items 103. In embodiments, agent abilities may be an unordered list of skills. In other embodiments, agent abilities may be an ordered list where the agent's best skill is listed at the top and the agent's worst skill is listed at the bottom. In another embodiment, the agent abilities may be ordered by including a proficiency skill level associated with each ability for each agent 105. Still in further embodiments, the agent abilities may simply be designated as primary or secondary for each agent 105. These are merely examples of how agent abilities may be ordered and should not be considered limiting. It should be understood that an agent's skill level/designation in an agent ability may change over time based on experience. Further in addition to agent abilities, each agent 105 has metadata that indicates whether the agent is actively assigned a work item 103, the type of work item assigned, the average handling time (AHT) for that type of work item based on the agent's abilities, and the time the work item was started.

The WAE 110 analyzes the list of agents 104 based on the metadata associated with each agent 105, using the WAE software module 111 to determine available agents 108 and passes the list of available agents 108 to a smart work allocator (SWA) 120. The list of available agents 108 contains agents 105 who are not currently assigned a work item 103 and agents 105 who are assigned a work item 103, but are soon-to-be available (collectively available agents 108). The WAE can use a number of ways to determine if an agent is soon-to-be available. One embodiment of determining if an agent is soon-to-be available is based on the monitored AHT for each given type of work on any given channel. For example, the metadata includes if an agent 105 is working on a billing enquiry email and the AHT for that type of work item is 4 minutes. If the agent has been working on the work item for 3 minutes, the WAE can predict the agent will become free in 1 minute and based on a time threshold 113 within WAS software module 111 for soon-to-be available can add that agent to the list of available agents at the appropriate time. The time threshold 113 includes rules that may be conditioned on the number of agents 104, the number of work items 102, the number of agents not currently assigned work items, and the AHT for a work item. For example, the time threshold 113 could be based on a set time (1 minute, 2 minutes, 30 seconds, etc.), a percentage of time remaining based on the AHT for the work item, or a percentage of time remaining based on the amount of work items in the work item queue. In embodiments, a soon to be available agent could also be an agent whose schedule indicates they will be scheduled to be available within the time threshold 113. For example, if the time threshold is 3 minutes and the agent's schedule indicates the agent will be back from a break or a meeting or otherwise available within the time threshold 113, that agent would be considered an available agent. These are merely examples of how the time threshold 113 could be determined and should not be considered limiting.

The WAE 110 also analyzes the work queue 102 using the WAE software module 111 based on a set of imminent work item rules (IWIR)115 to determine imminent work items 106 and passes the list of imminent work items 106 to the SWA 120. The list of imminent work items 106 includes the required skills associated with each work item 103 from the work queue 102.

The imminent work item rules 115 determine the order work items 103 are removed from the work queue 102 and the number of work items 103 that are included in the imminent work items 106. The imminent work item rules 115 may be conditioned on the number and type of work items 103 in the work queue 102 and/or the number and type of available agents 108. For example, IWIR 115 may indicate that imminent work items 106 are taken from the work queue 102 in a first-in first-out order. In embodiments, some work items 103 may be designated as urgent, and the IWIR 115 may indicate that urgent work items 103 should be included as imminent work items 106 ahead of other work items 103 in the work queue 102. In some embodiments, the IWIR 115 may indicated that the imminent work items 106 will be based on the SLA of the work item, such that the closer a work item is to breaching SLA the sooner it will be transferred to the imminent work item list 106. In embodiments, the number of imminent work items 106 is a set predetermined number. In this embodiment, it should be understood that if the number of current work items in the work queue is less than the predetermined number of imminent work items, the SWA 120 will receive all current work items from the work queue as the set of imminent work items. In other embodiments, the number of imminent work items the SWA 120 receives is dynamically determined by the IWIR 115. The analysis may be based on a percentage of total work items 103 in the work queue 102, the analysis may be based on the number of available agents 108, the analysis may be based on a combination of the number of work items 103 in the work queue 102 balanced against the number of agents available 108.

CEC system 100 also includes the SWA 120 having an SWA software module 121 and optional SWA storage 122. SWA 120 may be a processor or a combination of a processing system and a storage system. SWA 120 receives the set of imminent work items 106 with their required skills and the list of available agents 108 with their agent abilities and metadata from WAE unit 110 and analyzes the first imminent work item from the imminent work items list 106 and available agents 108 using SWA software module 121 to determine a best match agent from the list of available agents 108 for the first imminent work item from the imminent work items list 106 based on a determination of an optimal available agent using predetermined criteria 123 within SWA software module 121 and assigns the first imminent work item from the imminent work items list 106 to the best match agent if the best match agent's abilities are an exact match for the required skills of the first imminent work item. The best match agent will become the assigned agent 105 and the first imminent work item will become the assigned work item 103. Optionally, SWA 120 may also permanently or temporarily save a copy of the set of imminent work items 106, the list of available agents 108, the assigned agent 105, and/or the assigned work item 103 to internal or external SWA storage 122.

Predetermined criteria 123 include rules conditioned on the list of available agents and each agent's abilities 108 and the first imminent work item and its required skills 103 to determine the optimal match agent for the first imminent work item 103. The determination of a best match agent 105 can be based off of any combination of matching available agent abilities 108 to the required skills for the first imminent work item 103, depending on the information available for each set of skills and the level of ordered detail for the agent abilities and the required skills for the work item 103. For example, in the preferred embodiment, the predetermined criteria 123 may have a sliding goal for the best match agent. In this example the best match agent may be an available agent 108 who has an agent skill set that matches exactly the required skills for the imminent work item 103 (no more skills and no less skills than what is exactly required by the imminent work item 103). If there is no available agent with an exact skill set match, then the optimal match agent may be the first available agent 108 that has at least all of the required skills for the imminent work item 103 or the optimal match agent may be an available agent 108 that has at least all of the required skills for the imminent work item 103, but also has the least number of additional skills that are not required skills for the imminent work item 103. If there is no available agent who has all of the skills required for the imminent work item 103, then the next optimal match may be the available agent 108 who has the greatest number of skills of the required skills for the imminent work item 103. In this embodiment, the level of agent abilities and the level of skill required for the imminent work item 103 can also be taken into consideration, if that information is available, when determining the optimal match. In another embodiment, the predetermined criteria 123 for the optimal match agent may require that the available agent have at least the required skills of the imminent work item 103 and not consider an available agent 108 that does not have the required skills. In other embodiments, the predetermined criteria 123 for the optimal match may use the weight of the agents skills such that if two available agents 108 have the same skill set, but one agent has a necessary skill that is indicated to be a primary skill of that agent and the other agent does not have that skill indicated as a primarily skill the agent with the primary skill would be considered the optimal match. In some embodiments, agents will not be allowed to be matched with work items if they do not have at least all of the agent abilities indicated by the required skills of the work item. It should be understood that these are merely examples of predetermined criteria for determining the optimal match and should not be limiting.

When the best match agent does not have the exact agent abilities as the requires skills of the first imminent work item, the SWA software module 121 will analyze the best match agent and the imminent work items list to determine a best match imminent work item for the best match agent based on qualification criteria 125. The SWA will compare the required skills for the first imminent work item, the required skills for the best match work item, and the agent abilities for the best match agent and determine which work item, best match work item or first imminent work item, to assign to best match agent based on match selection rules 127. The SWA then assigns determined work item 103 to the best match agent 105.

Qualification criteria 125 determine which work item 103 on the imminent work item list 106, aside from the first imminent work item, is best suited for assignment to the best match agent based on what skills and/or level of skills are necessary for an agent to possess to be considered qualified to handle a work item. In one embodiment, the qualification criteria 125 will be based on the predetermined criteria 123 as described above. In embodiments where the system has information pertaining to the level of skill needed for a work item and the level of skill possessed by agents, the qualification criteria 125 may require that the best match agent not only possess at least the skills required by the required skills of the imminent work item 103, but also possess skills at least at the required level as required by the imminent work item 103 for the imminent work item to be a best match work item. In another embodiment, the qualification criteria 125 may require the best match agent to have at least one skill at the required level of the imminent work item 103 for the imminent work item to be considered the best match work item. In some embodiments, agents will not be allowed to be matched with work items if they do not have at least all of the agent abilities indicated by the required skills of the work item. It should be understood that these are merely examples of predetermined rules for determining which agents are considered qualified to handle an imminent work item and should not be limiting.

Match selection rules 127 determine which of the best match work item or the first imminent work item should be routed to the best match agent. In one embodiment, the match selection rules 127 will be an adaptation of the predetermined criteria 123 described above such that the work item selected to be routed to the best match agent will be the work item whose required skills most closely match the agent's abilities. In some embodiments, agents will not be allowed to be matched with work items if they do not have at least all of the agent abilities indicated by the required skills of the work item. In embodiments where the system has information pertaining to the level of skill needed for a work item and the level of skill possessed by agents, the match selection rules 127 may favor the work item where that the best match agent not only possess at least the skills required by the required skills of the imminent work item 103, but also possess skills at least at the required level as required by the imminent work item 103. In another embodiment, the match selection rules 127 may favor the work item where the best match agent has at least one skill at the required level of the imminent work item 103 for the imminent work item.

In some embodiments, the SWA 120 receives the set of imminent work items 106 with their required skills and the list of available agents 108 with their agent abilities and metadata from WAE unit 110 and analyzes the first imminent work item from the imminent work items list 106 and available agents 108 using SWA software module 121 to determine a best match agent from the list of available agents 108 for the first imminent work item from the imminent work items list 106 based on a determination of an optimal available agent using predetermined criteria 123 within SWA software module 121. The SWA software module 121 will next analyze the best match agent and the remaining items on the imminent work items list to determine a best match imminent work item for the best match agent based on qualification criteria 125. The SWA will compare the required skills for the first imminent work item, the required skills for the best match work item, and the agent abilities for the best match agent and determine which work item, best match work item or first imminent work item, to assign to best match agent based on match selection rules 127. The SWA then assigns determined work item 103 to the best match agent 105.

In the exemplary embodiment, CEC system 100 also includes at least one CEC desktop (not pictured) used by the assigned agent 105 for receiving assignment of imminent work items 106. CEC desktop may also receive input for updating imminent work item rules 115, time threshold 113, predetermined criteria 123, qualification criteria 125, and match selection rules 127.

FIG. 2 depicts a flowchart of an exemplary embodiment of method 200 for work allocation optimization.

At step 202, a WAE receives the work queue 102 from the CEC and determines if there are work items in the work queue. The CEC system provides a work queue 102 for work items 103 to be routed to agents 104.

If, at step 202, there are no work items 103 in the work queue, the method ends, otherwise the process moves on to step 204.

At step 204, the WAE receives a list of agents along with each agent's skill set 104.

At step 206, the WAE determines available agents 108 from the list of agents 104 and transfers the list of available agents 108 to a SWA. Available agents 108 are agents who are not currently assigned a work item 103 and agents that are soon-to-be available. Soon-to-be available agents are agents currently assigned a work item 103, but, as described above in FIG. 1, the WAE determines the agents are soon-to-be available based on the time threshold rules.

At step 208, the WAE analyzes the work queue 102, determines a set of imminent work 106 based on the analysis and passes the set of imminent work items 106 to the SWA. It should be understood that steps 206 and 208 may be performed in reverse order, simultaneously, or near simultaneously.

If, at step 206, there are no available agents 108, then the method repeats from step 202, otherwise the process moves on to step 210.

At step 210, the SWA receives the list of available agents 108 and the set of imminent work items 106 from the WAE. The list of available agents 108 includes the agent abilities and metadata. The set of imminent work items 106 includes the required skills.

At step 212, the SWA will compare the required skills for the first imminent work item from the imminent work items list 106 to the agent skills for the available agents 108 and will determine a best match agent for the first imminent work item based on predetermined criteria 123. In the preferred embodiment, the best match agent will be an available agent 108 who has an agent skill set that matches exactly the requires skills for the imminent work item, this is considered the best match. If there is no available agent 108 with an exact skill set match (no more skills and no less skills than what is exactly required by the imminent work item), then the best match agent will be the first available agent that has all of the skills required for the imminent work item. If there is no available agent who has all of the skills required for the imminent work item, then the best match will be the available agent who has the greatest number of skills for the skills required by the imminent work item.

If the best match agent is an exact match for an imminent work item, at step 214, the first imminent work item is routed to the best match agent and the first imminent work item becomes the assigned work item 103 and the best match agent becomes the assigned agent 105.

At step 216, the imminent work items 106 and the available agents 108 are updated, removing the assigned work item 103 from the imminent work items 106 and removing the assigned agent 105 from the available agents list 108.

If there are still imminent work items that have been received by the SWA, the process will repeat from step 212 with the updated imminent work items and the updated available agents. If no imminent work items remain, the system will repeat from step 202.

If the best match agent is not an exact match for the first imminent work item, at step 218, the SWA will determine, from the queue of remaining imminent work items 106, the best match work item for the best match agent's set of skills based on qualification criteria 125.

At step 220, the SWA will compare the skills of the best match agent to the skills needed for the first imminent work item and to the skills needed for the best match work item and determine based off of match selection rules 127 which work item will be routed to the best match agent.

If next best match work item has been chosen at step 220, at step 222 the next best match work item is routed to the best match agent and the best match work item becomes the assigned work item 103 and the best match agent becomes the assigned agent 105.

At step 224, the imminent work items 106 and the available agents 108 are updated, removing the assigned work item 103 from the imminent work items 106 and removing the assigned agent 105 from the available agents list 108. The method will repeat from step 212 with the updated imminent work item list 106 and the updated available agent list 108.

If the first imminent work item is chosen at step 220, at step 226 the first imminent work item is routed to the best match agent and the first imminent work item becomes the assigned work item 103 and the best match agent becomes the assigned agent 105.

At step 228, the imminent work items 106 and the available agents 108 are updated, removing the assigned work item 103 from the imminent work items 106 and removing the assigned agent 105 from the available agents list 108.

If there are still imminent work items that have been received by the SWA, the system will repeat from step 212 with the updated imminent work item list 106 and the updated available agent list 108. If no imminent work items remain, the system will repeat from step 202.

Figure 4:
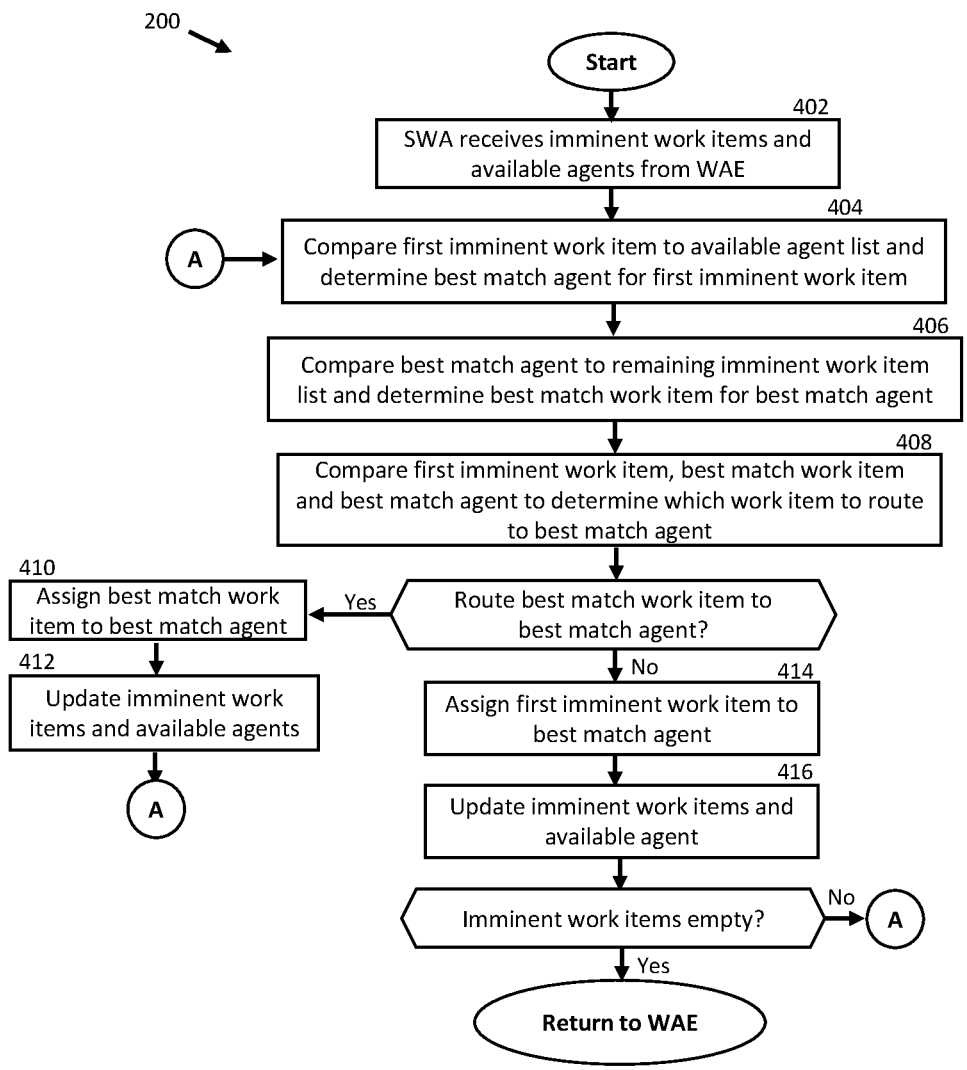
FIG. 4 depicts a flowchart of exemplary embodiment of method 200 for SWA work allocation optimization.

FIG. 4 depicts a flowchart of exemplary embodiment of method 200 for SWA work allocation optimization. In this embodiment, the WAE method is as described above in FIG. 2; however, the SWA follows the method below, rather than the method described above in FIG. 2.

At step 402, the SWA receives the list of available agents 108 and the set of imminent work items 106 from the WAE. The list of available agents 108 includes the agent abilities and metadata. The set of imminent work items 106 includes the required skills.

At step 404, the SWA will compare the required skills for the first imminent work item from the imminent work items list 106 to the agent skills for the available agents 108 and will determine a best match agent for the first imminent work item based on predetermined criteria 123. In the preferred embodiment, the best match agent will be an available agent 108 who has an agent skill set that matches exactly the requires skills for the imminent work item, this is considered the best match. If there is no available agent 108 with an exact skill set match (no more skills and no less skills than what is exactly required by the imminent work item), then the best match agent will be the first available agent that has all of the skills required for the imminent work item. If there is no available agent who has all of the skills required for the imminent work item, then the best match will be the available agent who has the greatest number of skills for the skills required by the imminent work item.

At step 406, the SWA will determine, from the queue of remaining imminent work items 106, the best match work item for the best match agent's set of skills based on qualification criteria 125.

At step 408, the SWA will compare the skills of the best match agent to the skills needed for the first imminent work item and to the skills needed for the best match work item and determine based off of match selection rules 127 which work item will be routed to the best match agent.

If next best match work item has been chosen at step 408, at step 410 the next best match work item is routed to the best match agent and the best match work item becomes the assigned work item 103 and the best match agent becomes the assigned agent 105.

At step 412, the imminent work items 106 and the available agents 108 are updated, removing the assigned work item 103 from the imminent work items 106 and removing the assigned agent 105 from the available agents list 108. The method will repeat from step 112 with the updated imminent work item list 106 and the updated available agent list 108.

If the first imminent work item is chosen at step 408, at step 414 the first imminent work item is routed to the best match agent and the first imminent work item becomes the assigned work item 103 and the best match agent becomes the assigned agent 105.

At step 416, the imminent work items 106 and the available agents 108 are updated, removing the assigned work item 103 from the imminent work items 106 and removing the assigned agent 105 from the available agents list 108.

If there are still imminent work items that have been received by the SWA, the system will repeat from step 404 with the updated imminent work item list 106 and the updated available agent list 108. If no imminent work items remain, the system will return to the WAE method as described in FIG. 2, steps 202 through 208.

Figure 3:
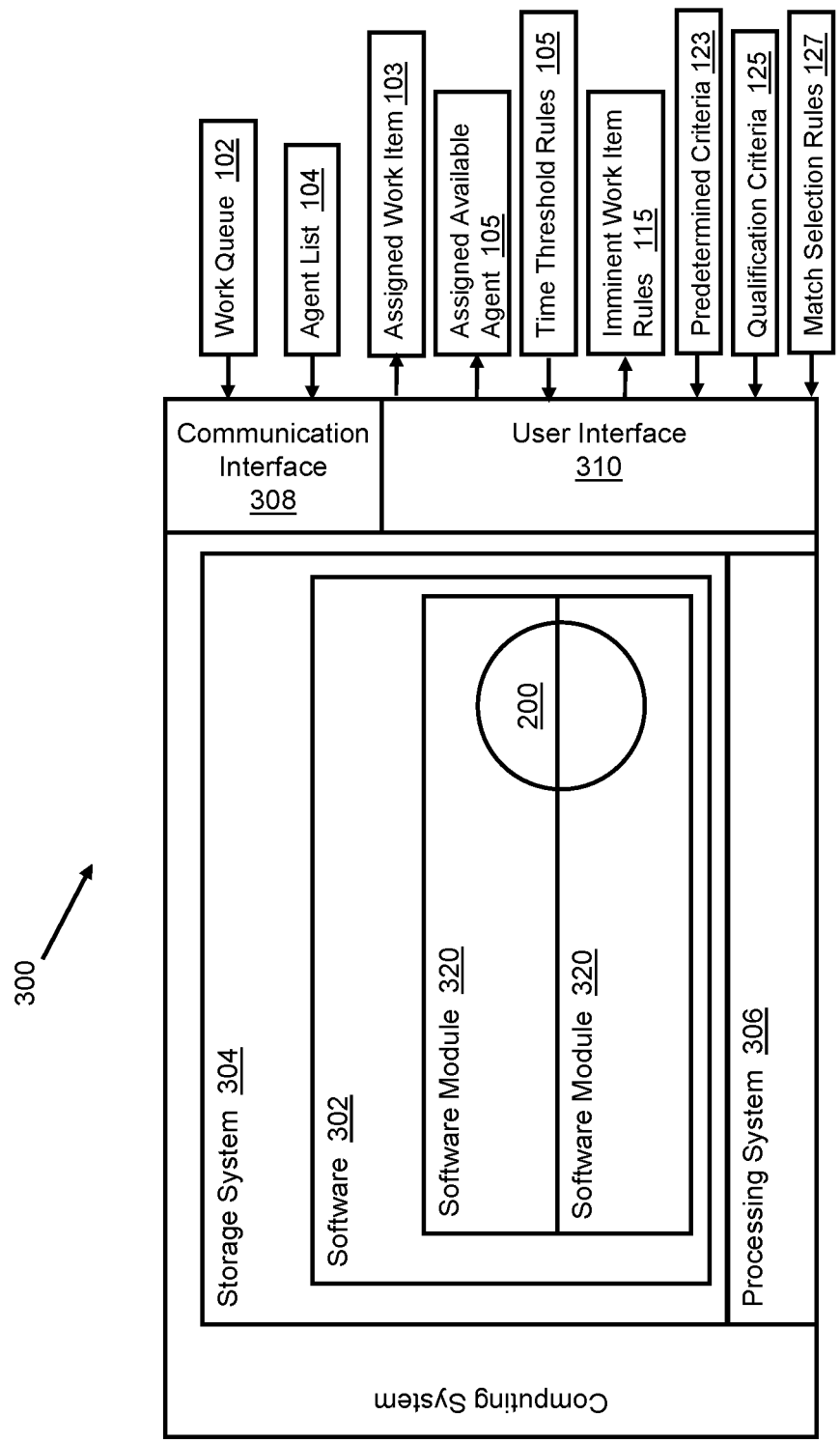
FIG. 3 depicts an exemplary embodiment of a system for work allocation optimization.

FIG. 3 depicts an exemplary embodiment of system 300 for work allocation optimization using CEC system 100.

System 300 is generally a computing system that includes a processing system 306, a storage system 304, software 302, a communication interface 308, and a user interface 310. Processing system 306 loads and executes software 302 from the storage system 304, including a software module 320. When executed by computing system 300, software module 320 directs the processing system 306 to operate as described in herein in further detail in accordance with the method 200.

Computing system 300 includes a software module 320 for performing the function of CEC system 100. Although computing system 300 as depicted in FIG. 3 includes two software modules 320 for performing the functions of Work Acquisition Engine (WAE) software module 110 and/or SWA software module 120 in the present example, it should be understood that one or more modules could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. Processing system 306 can be implemented within a single processing device but can also be distributed across multiple processing devices or subsystems that cooperate in existing program instructions. Examples of processing systems 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as computer readable instructions, data structures, program modules, or other information. Storage system 304 can be implemented as a single storage device but may also be implemented across multiple storage devices or sub-systems. Storage system 304 can further include additional elements, such a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300.

User interface 310 can include one or more CEC desktops, a mouse, a keyboard, a voice input device, a touch input device for receiving a gesture from a user, a motion input device for detecting non-touch gestures and other motions by a user, and other comparable input devices and associated processing elements capable of receiving user input from a user. The user interface 310 through the CEC desktops is also integrated into the CEC system 100 allowing the user to access the CEC telephone system, the CEC internet system, the CEC text communications systems, among other CEC systems. Output devices such as a video display or graphical display can display assigned work items 103, the agent 105 to which the work item is assigned, or another interface further associated with embodiments of the system and method as disclosed herein. Speakers, printers, haptic devices and other types of output devices may also be included in the user interface 310. A CSR, a supervisor or other staff can communicate with computing system 300 through the user interface 310 in order to view assigned work items 103 and assigned agents 105, and in order to update time threshold rules 113, imminent work item rules 115, predetermined criteria 123, qualification criteria 125, match selection rules 127, or any number of other tasks the CSR, supervisor or other staff may want to complete with computing system 300.

As described in further detail herein, computing system 300 receives and transmits data through communication interface 308. In embodiments, the communication interface 308 operates to send and/or receive data, such as, but not limited to, current work queue 102 and the listing of working agents with their respective skills 104 to/from other devices and/or systems to which computing system 300 is communicatively connected, and to receive and process input into the system. Such information can include input related to work item skill requirements and personnel skill sets.

It should be understood that the system and method it intended and capable of being operable in real-time or close to real-time to dynamically and automatedly assign work items 103 in the work queue 102 to a dynamically changing list of available agents 108 to optimize the assignment of work items. However, it is also contemplated and possible for the system to receive a set work queue 102 and an initial list of available agents 108 to create a work assignment schedule by assigning work items 103 to available agents 108 and then assigning the remainder of the work items from the work queue by simulating the work flow using the methods stated above for determining when an agent will become available to receive additional work items 103.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for real time best match work item allocation, comprising:
providing a customer engagement center system for receiving work items and optimizing routing of incoming work items, the customer engagement center system including:
a communication interface,
a user interface,
a work item queue,
a source of a work item, the work item being a work item data structure comprising a work item identification, a type of work item, and a set of required skills associated with the work item,
a work acquisition engine,
a smart work allocator, for binding and routing the work item, and
a customer engagement center desktop,
wherein the source of work item is operably connected to the communication interface, which is operably connected to the work item queue, further wherein the work acquisition engine is operably connected to the work item queue and the smart work allocator, further wherein the smart work allocator is operably connected to the user interface which is operably connected to the customer engagement center desktop;
receiving a work item through the communication interface and adding the work item to the work item queue in real-time, the work item queue comprising all work items received through the communication interface that are not yet included on an ordered imminent work items list;
receiving an agent list by the work acquisition engine, the agent list including a plurality of agent identifications, each agent identification being an agent identification data structure comprising an agent identification indicator, a set of agent abilities associated with the agent identification, and a set of agent metadata, the set of agent metadata including a real-time indication of a currently assigned work item, a type for the currently assigned work item, an average handling time for the type of currently assigned work item, and a start time for the currently assigned work item;
generating, by the work acquisition engine, an available agent list from the agent list by transferring all agent identifications included on the agent list that are available agent identifications and soon to be available agent identifications from the agent list to the smart work allocator, an available agent identification including all agent identification data structures with the real-time indication of the currently assigned work item indicating no assigned work item, a soon to be available agent identification being all agent identification data structures that the work acquisition engine predicts will have an indication of no assigned work item for the real-time indication of the currently assigned work item within a threshold time;
generating, by the work acquisition engine, an ordered imminent work items list by transferring all work items included in the work item queue identified by the work acquisition engine as imminent work items from the work item queue to the smart work allocator, the ordered imminent work items list including a subset of work item data structures from the work item queue classified by the work acquisition engine as being imminent work items based on the type of work item, a quantity of work items in the work item queue, and a current number of agent identification data structures on the available agent list;
generating a best match agent identification from the available agent list for a first work item on the ordered imminent work item list, by the smart work allocator, based on a set of predetermined criteria, the best match agent identification being one agent identification data structure from the available agent list with the agent identification most qualified to handle the work item identification contained in the work item data structure associated with the first work item and correlating the one agent identification data structure with the best match agent identification, the set of predetermined criteria applied being dynamically based on the agent identification data structures on the available agent list;
generating a best match work item identification from the ordered imminent work item list for the best match agent identification, by the smart work allocator, based on the set of predetermined criteria, the best match work item identification being one work item data structure from the ordered imminent work item list with the work item identification the best match agent identification is most qualified to handle and correlating the one work item data structure with the best match work item identification;
identifying, by the smart work allocator, a single work item to assign to the best match agent identification, the single work item being the work item identification associated with the work item data structure among the best match work item identification and the first work item on the ordered imminent work item list that the best match agent identification is most qualified to handle and associating that work item data structure with the single work item;
assigning the single work item to the best match agent identification by binding the work item data structure correlated with the single work item to the agent identification data structure correlated with the best match agent;
updating the agent metadata for the best match agent identification using the work item data structure correlated with the single work item;
updating the ordered imminent work item list by removing the work item data structure correlated to the single work item;
updating the available agent list by removing the agent identification data structure correlated to the best match agent identification from the available agent list; and
routing, by the smart work allocator, the single work item through the user interface to the customer engagement center desktop associated with the best make agent identification.

2. The method of claim 1, further comprising repeating steps performed by the smart work allocator with the updated ordered imminent work item list and the updated available agent list until the ordered imminent work item list is empty.

3. The method of claim 1, wherein available agent identifications are determined based on whether the agent identification indicator is currently assigned a work item.

4. The method of claim 1, wherein generating soon to be available agent identifications include:
determining that an agent identification is soon to be available based on the real-time indication of the currently assigned work item, the type for the currently assigned work item, the average handling time for the type of currently assigned work item; and the start time for the currently assigned work item.

5. The method of claim 1, wherein the required skills are attributes that the customer engagement center system has determined are beneficial for handling the work item identification.

6. The method of claim 5, wherein the set of agent abilities are attributes indicating an ability of the agent associated with the agent identification indicator to handle the required skills associated with the work item identification.

7. The method of claim 6, wherein the predetermined criteria include determining a matching of the required skills associated with the work item identification for the first work item and the set of agent abilities associated with the agent identifications on the available agent list.

8. The method of claim 6, wherein generating the best match work item is also based on a set of qualification criteria, qualification criteria including determining a matching of the set of agent abilities associated with the agent identification of the best match agent identification and the required skills associated with the work item identification of the remaining work item identifications on the ordered imminent work item list.

9. The method of claim 6, wherein the identifying the single work item is also based on match selection rules that use the set of agent abilities associated with the best match agent identification, the required skills associated with the best match work item identification, and the required skills associated with the first work item.

10. The method of claim 9, wherein the match selection rules will assign the best match agent identification to the first work item if the set of agent abilities associated with the best match agent identification and the required skills associated with the first work item are an exact match, wherein an exact match requires that each of the required skills associated with the first work item correlate to one of the agent abilities associated with the best match agent identification.

11. The method of claim 9, wherein the match selection rules will assign the best match agent identification to the best match work item identification if the set of agent abilities associated with the best match agent identification and the required skills associated with the best match work item identification are an exact match, wherein an exact match requires that each of the required skills associated with the first work item correlate to one of the agent abilities associated with the best match agent identification.

12. A system for real-time best match work item allocation, comprising:
a customer engagement center system for receiving work items and optimizing routing of incoming work items, the customer engagement center system including:
a communication interface;
a user interface,
a work item queue;
a source of a work item, the work item being a work item data structure comprising a work item identification, a type of work item, and a set of required skills associated with the work item;
a work acquisition engine;
a smart work allocator, for binding and routing the work item, and
a customer engagement center desktop,
wherein the source of work item is operably connected to the communication interface, which is operably connected to the work item queue, further wherein the work acquisition engine is operably connected to the work item queue and the smart work allocator, further wherein the smart work allocator is operably connected to the user interface which is operably connected to the customer engagement center desktop;
a processor, the processor operably coupled to the communication interface, the user interface, the work item queue, and the customer engagement center desktop; and
a non-transitory computer readable medium programmed with computer readable code that upon execution by the processor causes the processor to execute a method for real-time best match work item allocation, comprising:
receiving a work item through the communication interface and adding the work item to the work item queue in real-time, the work item queue comprising all work items received through the communication interface that are not yet included on an ordered imminent work items list;
receiving an agent list by the work acquisition engine, the agent list including a plurality of agent identifications, each agent identification being an agent identification data structure comprising an agent identification indicator, a set of agent abilities associated with the agent identification, and a set of agent metadata, the set of agent metadata including a real-time indication of a currently assigned work item, a type for the currently assigned work item, an average handling time for the type of currently assigned work item, and a start time for the currently assigned work item;
generating, by the work acquisition engine, an available agent list from the agent list by transferring all agent identifications included on the agent list that are available agent identifications and soon to be available agent identifications from the agent list to the smart work allocator, an available agent identification including all agent identification data structures with the real-time indication of the currently assigned work item indicating no assigned work item, a soon to be available agent identification being all agent identification data structures that the work acquisition engine predicts will have an indication of no assigned work item for the real-time indication of the currently assigned work item within a threshold time;
generating, by the work acquisition engine, an ordered imminent work items list by transferring all work items included in the work item queue identified by the work acquisition engine as imminent work items from the work item queue to the smart work allocator, the ordered imminent work items list including a subset of work item data structures from the work item queue classified by the work acquisition engine as being imminent work items based on the type of work item, a quantity of work items in the work item queue, and a current number of agent identification data structures on the available agent list;

generating a best match agent identification from the available agent list for a first work item on the ordered imminent work item list, by the smart work allocator, based on a set of predetermined criteria, the best match agent identification being one agent identification data structure from the available agent list with the agent identification most qualified to handle the work item identification contained in the work item data structure associated with the first work item and correlating the one agent identification data structure with the best match agent identification, the set of predetermined criteria applied being dynamically based on the agent identification data structures on the available agent list;

generating a best match work item identification from the ordered imminent work item list for the best match agent identification, by the smart work allocator, based on the set of predetermined criteria, the best match work item identification being one work item data structure from the ordered imminent work item list with the work item identification the best match agent identification is most qualified to handle and correlating the one work item data structure with the best match work item identification;

identifying, by the smart work allocator, a single work item to assign to the best match agent identification, the single work item being the work item identification associated with the work item data structure among the best match work item identification and the first work item on the ordered imminent work item list that the best match agent identification is most qualified to handle and associating that work item data structure with the single work item;

assigning the single work item to the best match agent identification by binding the work item data structure correlated with the single work item to the agent identification data structure correlated with the best match agent;

updating the agent metadata for the best match agent identification using the work item data structure correlated with the single work item;

updating the ordered imminent work item list by removing the work item data structure correlated to the single work item;

updating the available agent list by removing the agent identification data structure correlated to the best match agent identification from the available agent list; and routing, by the smart work allocator, the single work item through the user interface to the customer engagement center desktop associated with the best match agent identification.

13. The system of claim 12, the method executed further comprising repeating the steps of the smart work allocator with the updated ordered imminent work item list and the updated available agent list until the ordered imminent work item list is empty.

14. The system of claim 12, wherein available agent identifications are determined based on whether the agent identification indicator is currently assigned a work item.

15. The system of claim 12, wherein generating soon to be available agent identifications includes:
determining that an agent identification is soon to be available based on the real-time indication of the currently assigned work item, the type for the currently assigned work item, the average handling time for the type of currently assigned work item; and the start time for the currently assigned work item.

16. The system of claim 12, wherein the required skills are attributes that the customer engagement center system has determined are beneficial for handling the work item identification.

17. The system of claim 16, wherein the set of agent abilities are attributes indicating an ability of the agent associated with the agent identification indicator to handle the required skills associated with the work item identification.

18. The system of claim 17, skills associated with the work item identification for the first work item and the set of agent abilities associated with the agent identifications on the available agent list,
further wherein generating the best match work item is also based on a set of qualification criteria, qualification criteria including determining a matching of the set of agent abilities associated with the agent identification indicator of the best match agent identification and the required skills associated with the work item identification of the remaining work item identifications on the ordered imminent work item list, and
further wherein the identifying the single work item is also based on match selection rules that use the set of agent abilities associated with the best match agent identification, the required skills associated with the best match work item identification, and the required skills associated with the first work item.

19. The system of claim 18, wherein the match selection rules will assign the best match agent identification to the first work item if the set of agent abilities associated with the best match agent identification and the required skills associated with the first work item are an exact match, wherein an exact match requires that each of the required skills associated with the first work item correlate to one of the agent abilities associated with the best match agent identification.

20. The system of claim 18, wherein the match selection rules will assign the best match agent identification to the best match work item identification if the set of agent abilities associated with the best match agent identification and the required skills associated with the best match work item identification are an exact match, wherein an exact match requires that each of the required skills associated with the first work item correlate to one of the agent abilities associated with the best match agent identification.

21. A non-transitory computer readable medium programmed with computer readable code that upon execution by a processor causes the processor to execute a method for real-time best match work item allocation, comprising:
providing a customer engagement center system for receiving work items and optimizing routing of incoming work items, the customer engagement center system including:
a communication interface,
a user interface,
a work item queue,
a source of a work item, the work item being a work item data structure comprising a work item identification, a type of work item, and a set of required skills associated with the work item,
a work acquisition engine,
a smart work allocator, for binding and routing the work item, and
a customer engagement center desktop,
wherein the source of work item is operably connected to the communication interface, which is operably connected to the work item queue, further wherein the work acquisition engine is operably connected to the work item queue and the smart work allocator, further wherein the smart work allocator is operably connected to the user interface which is operably connected to the customer engagement center desktop;

receiving a work item through the communication interface and adding the work item to the work item queue in real-time, the work item queue comprising all work items received through the communication interface that are not yet included on an ordered imminent work items list;

receiving an agent list by the work acquisition engine, the agent list including a plurality of agent identifications, each agent identification being an agent identification data structure comprising an agent identification indicator, a set of agent abilities associated with the agent identification, and a set of agent metadata, the set of agent metadata including a real-time indication of a currently assigned work item, a type for the currently assigned work item, an average handling time for the type of currently assigned work item, and a start time for the currently assigned work item;

generating, by the work acquisition engine, an available agent list from the agent list by transferring all agent identifications included on the agent list that are available agent identifications and soon to be available agent identifications from the agent list to the smart work allocator, an available agent identification including all agent identification data structures with the real-time indication of the currently assigned work item indicating no assigned work item, a soon to be available agent identification being all agent identification data structures that the work acquisition engine predicts will have an indication of no assigned work item for the real-time indication of the currently assigned work item within a threshold time;

generating, by the work acquisition engine, an ordered imminent work items list by transferring all work items included in the work item queue identified by the work acquisition engine as imminent work items from the work item queue to the smart work allocator, the ordered imminent work items list including a subset of work item data structures from the work item queue classified by the work acquisition engine as being imminent work items based on the type of work item, a quantity of work items in the work item queue, and a current number of agent identification data structures on the available agent list;

generating a best match agent identification from the available agent list for a first work item on the ordered imminent work item list, by the smart work allocator, based on a set of predetermined criteria, the best match agent identification being one agent identification data structure from the available agent list with the agent identification most qualified to handle the work item identification contained in the work item data structure associated with the first work item and correlating the one agent identification data structure with the best match agent identification, the set of predetermined criteria applied being dynamically based on the agent identification data structures on the available agent list;

generating a best match work item identification from the ordered imminent work item list for the best match agent identification, by the smart work allocator, based on the set of predetermined criteria, the best match work item identification being one work item data structure from the ordered imminent work item list with the work item identification the best match agent identification is most qualified to handle and correlating the one work item data structure with the best match work item identification;

identifying, by the smart work allocator, a single work item to assign to the best match agent identification, the single work item being the work item identification associated with the work item data structure among the best match work item identification and the first work item on the ordered imminent work item list that the best match agent identification is most qualified to handle and associating that work item data structure with the single work item;

assigning the single work item to the best match agent identification by binding the work item data structure correlated with the single work item to the agent identification data structure correlated with the best match agent;

updating the agent metadata for the best match agent identification using the work item data structure correlated with the single work item;

updating the ordered imminent work item list by removing the work item data structure correlated to the single work item;

updating the available agent list by removing the agent identification data structure correlated to the best match agent identification from the available agent list; and routing, by the smart work allocator, the single work item through the user interface to the customer engagement center desktop associated with the best match agent identification.

* * * * *